Aug. 2, 1966  W. E. LOWERY  3,264,166
LAMINATED WEB AND METHOD FOR MAKING SAME
Filed March 28, 1962
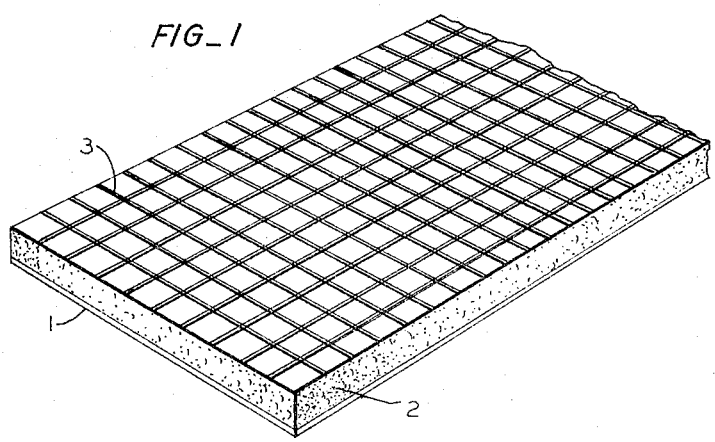
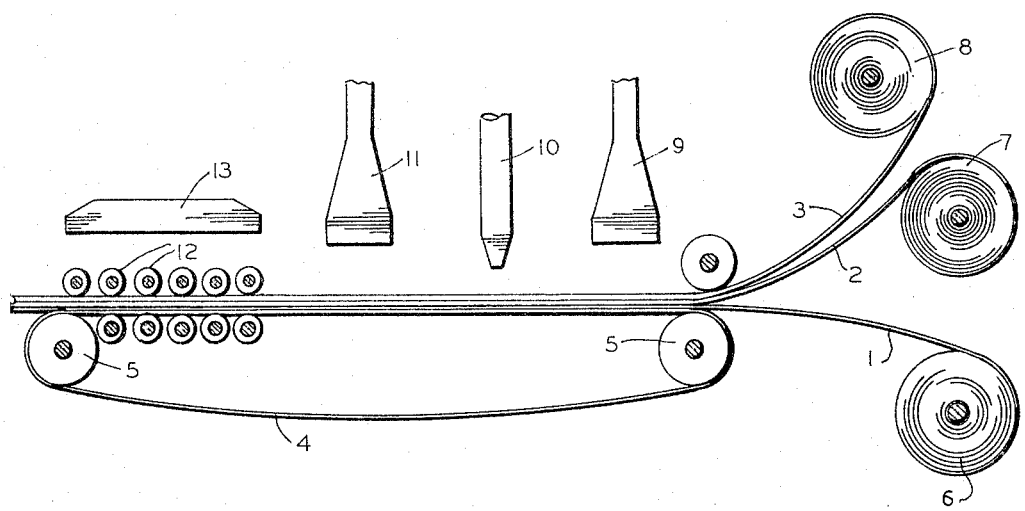
INVENTOR.
WILLIAM E. LOWERY
BY Hoppe and Mitchell
ATTORNEYS

United States Patent Office 3,264,166
Patented August 2, 1966

3,264,166
LAMINATED WEB AND METHOD FOR
MAKING SAME
William E. Lowery, Costa Mesa, Calif., assignor, by mesne assignments, to Califoam Corporation of America, Compton, Calif., a corporation of California
Filed Mar. 28, 1962, Ser. No. 183,309
4 Claims. (Cl. 161—89)

This invention relates generally to laminated webs and to methods for making laminated structures. More particularly the invention relates to laminated urethane foam and fabric webs useful as rug underlay and to methods for making them.

One object of the present invention is to provide an improved rug underlay comprising a laminated urethane foam and fabric web.

Another object of the present invention is to provide improved continuous methods for fabricating laminated urethane foam materials.

The foregoing and other objects and advantages of the present invention will become apparent upon a consideration of the following description of a specific embodiment of the invention and the accompanying drawing wherein FIG. 1 is a perspective view partially in section of a form of laminated urethane foam web structure embodying the present invention; and FIG. 2 is a diagrammatic illustration of a method and apparatus useful for fabricating the laminated web structure.

The structure of the present invention is particularly useful as a rug underlay and comprises a laminated web including a strippable backing 1, an interlayer of flexible urethane foam 2, and an overlying fabric mesh 3. The fabric mesh 3 is adhered to the flexible urethane foam 2 by a collapsed foam coating described herein, which functions as an adhesive. The strippable backing 1 acts as a protective means during fabrication and storage. This layer is stripped from the web structure at such time as the underlay is placed in actual use or it may be stripped just prior to rolling the web for convenient storage.

The urethane foams utilized in the present invention are of the polyether type; however, the described product and techniques also may use polyester type foams. The foam interlayer is flexible and in thicknesses, for instance, ⅜, 5/16 or ¼ inch depending upon the particular service requirements for the rug underlay. The fabric mesh layer comprises an open netting or scrim of ¼ inch mesh jute and cotton, for example. Other suitable mesh materials will be apparent to those familiar with the rug underlay art. One suitable strippable backing is strong glassine type paper.

The foregoing laminated structure is fabricated with the apparatus illustrated schematically in FIG. 2 and by the described continuous methods. The improved methods are carried out upon a moving conveyor, illustrated in FIG. 2 as an endless belt 4, approximately 70 feet long and about 12 feet wide trained over suitable drive and idler sprockets 5. The belt travels at a speed of approximately twelve to twenty feet per minute.

The three layers forming the composite laminated web feed simultaneously from storage rolls onto the continuous conveyor. The strippable backing 1 stored upon roll 6 feeds first onto conveyor 4. The interlayer of urethane foam 2 stored upon roll 7 feeds on top of the strippable backing followed by the fabric mesh 3 stored on roll 8.

The composite web then passes through heating means 9, such as a bank of infrared lamps. This heating means warms the upper surface of the urethane foam 2 and the mesh 3 to approximately 150° F. to furnish a warm surface upon which the heated reactants for the collapsed foam coating are deposited.

The heated web next passes under spray nozzle means 10 through which the reactants forming the collapsed foam coating are sprayed over the upper surface of the composite web. The coating comprises a "one-shot" urethane foam composition formulated for extremely rapid $CO_2$ evolution to produce a collapsed foam coating. The coating reactants are preheated to approximately 120–150° F. and then sprayed under pressure through mixing spray nozzle means upon the moving composite web. The spray nozzle means 10 includes, for example, an airless high pressure Grayco spray nozzle, manufactured by Gray Spray Equipment Company operating under 2500 p.s.i.g. pressure from a pressured reservoir system.

One formulation useful for producing a satisfactory collapsed foam includes the following components in the stated proportions (by weight):

| | Parts |
|---|---|
| Trifunctional polypropylene glycol (for example, LG–56 sold by Union Carbide Co. of New York, N.Y.) | 90 |
| Tetrafunctional polypropylene glycol (for example Quadrol sold by Wyandotte Chemicals Corporation of Wyandotte, Michigan) | 10 |
| Toluene diisocyanate | 30 |
| Water | 2 |
| Silicone foam stabilizer (type L–520 sold by Union Carbide Company of New York, N.Y.) | 0.1 |
| Catalyst: | |
|    Amine type (Dabco sold by Houdry Process Corp. of Philadelphia, Pennsylvania) | 0.3 |
|    Stannous octoate (type T–9 sold by Metal & Thermit Corporation of New York, N.Y.) | 0.5 |

As an alternative catalyst system 0.75 part either of lead octasol or lead octoate may be used in the foregoing formulation. Other highly reactive polyols also may be used in place of the foregoing tetrafunctional polyol such as type LA– 700 sold by Union Carbide Company.

This formulation begins to foam immediately upon application and evolves $CO_2$ so rapidly that the green foam collapses in a thin skin or coating overlying the mesh 3 and exposed portions of the urethane foam interlayer. The coating encapsulates the mesh strands and firmly bonds the mesh to the urethane foam interlayer 2. The foregoing formulation may be modified to eliminate the water component. With such a formulation no $CO_2$ evolves and the formulation does not foam, but rather, forms an elastomeric coating which encapsulates and bonds the mesh to the urethane foam interlayer 2.

The composite web then passes under a second heating means 11, as the similar bank of infrared lamps, to accelerate curing of the green coating. The heat partially cures the coating material to a non-tacky skin surface. The curing temperature is not critical.

The partially cured web then passes through a series of pinch rollers 12 which compress the composite web structure to approximately 50% of its normal free height for a period of approximately 1 to 2½ minutes. Simultaneously the web is maintained at an elevated curing temperature by radiant heating means 13 overlying the rollers.

The composite web finally is cooled to below 100° F. It then may be rolled directly upon storage rolls with the strippable backing in place or the backing may first be stripped and the remaining web structure rolled upon a storage roll. Trimming and cutting operations may be incorporated prior to the final rolling to provide a smooth edged product and to sever the composite web into standard widths.

In an alternative form the strippable backing 1 is not used. The flexible urethane foam 2 is run directly onto the conveyor 4, the mesh placed upon it and the collapsed foam coating sprayed as described. In the absence of a strippable backing it is important that the composite be thoroughly cured prior to rolling for storage.

The described composite web structure provides an extremely satisfactory rug underlay able to withstand the concentrated forces developed, for example by women's high heeled shoes, which rapidly break down ordinary rug underlays. The foregoing specific embodiments of the laminated structure, and the methods have been presented for clarity of understanding only and no unnecessary limitations should be understood therefrom for the invention as defined in the appended claims.

I claim:
1. A method for making a laminated web which comprises, arranging a fabric web having openings between strands thereof over a flexible web of polyurethane foam with the fabric web in face to face engagement with the upper surface of the polyurethane web, heating the fabric web and the upper surface of the polyurethane web to a temperature below the fusion temperature of the polyurethane to warm the fabric and the upper surface of the polyurethane web, projecting a heated unstable foamable polyurethane reaction mixture onto said strands and through the openings in the fabric web onto the upper surface of the polyurethane web where the mixture foams and collapses to provide a coating skin encapsulating the strands of the fabric web bonding it to the polyurethane web, and curing the collapsed polyurethane coating.

2. A method for making a laminated web which comprises, arranging a fabric web having openings between strands thereof in face to face engagement with a flexible web of polyurethane foam, maintaining the fabric web in engagement with the face of said polyurethane web, applying a coating of an unstable foamable polyurethane reaction mixture onto said strands and through the openings in the fabric web onto said face of the polyurethane web, foaming the coating to evolve substantially all of the gas therefrom whereby the polyurethane coating collapses and forms a skin encapsulating the strands of the fabric web bonding it to the polyurethane web, and curing the collapsed polyurethane coating.

3. A method for making a laminated structure which comprises, assembling a polyurethane foam web and a fabric mesh in face to face relationship, coating the fabric mesh and adjacent surface of said foam web with an unstable foamable polyurethane reaction mixture, foaming the coating until collapse of the foam into a polyurethane skin coating encapsulating the fabric mesh and adhering to the adjacent surface of the foam web, and curing the skin coating to bond the fabric mesh to said foam web.

4. A composite laminated web comprising a flexible resilient web of polyurethane foam, a fabric mesh web having openings between the strands thereof in face to face engagement with one surface of said polyurethane web, and a polyurethane skin coating encapsulating said strands and adhering to adjacent portions of the surface of said polyurethane web bonding the fabric web to said polyurethane web.

References Cited by the Examiner

UNITED STATES PATENTS

| | | | |
|---|---|---|---|
| 2,841,515 | 7/1958 | Runton | 156—78 X |
| 2,866,722 | 12/1958 | Gensel et al. | 117—16 X |
| 2,948,650 | 8/1960 | Jackson et al. | 161—159 X |
| 2,955,056 | 10/1960 | Knox | 117—98 |
| 2,956,310 | 10/1960 | Roop et al. | 156—79 |
| 2,957,793 | 10/1960 | Dickey | 156—306 X |
| 3,062,698 | 11/1962 | Aykanian | 156—306 |
| 3,085,896 | 4/1963 | Britt et al. | 117—161 X |

FOREIGN PATENTS

| | | |
|---|---|---|
| 842,267 | 9/1952 | Germany. |
| 390,312 | 4/1933 | Great Britain. |

EARL M. BERGERT, *Primary Examiner.*

J. J. BURNS, T. R. SAVOIE, *Assistant Examiners.*